United States Patent [19]
Lee et al.

[11] Patent Number: 4,992,919
[45] Date of Patent: Feb. 12, 1991

[54] PARALLEL RESONANT CONVERTER WITH ZERO VOLTAGE SWITCHING

[76] Inventors: Chu-Quon Lee; Kasemsan Siri, both of P.O. Box 4348, Chicago, Ill. 60608; Anand K. Upadhyay, 2006 Chinkapin Oak Dr., Mt. Prospect, Ill. 60056

[21] Appl. No.: 458,993

[22] Filed: Dec. 29, 1989

[51] Int. Cl.$^5$ ............................................. H02M 3/335
[52] U.S. Cl. ........................................ 363/17; 363/79; 363/98; 363/132
[58] Field of Search ........................ 363/17, 24, 25, 26, 363/97, 98, 132, 134, 75, 79

[56] References Cited

U.S. PATENT DOCUMENTS

| | | | |
|---|---|---|---|
| 4,677,345 | 6/1987 | Nilssen | 363/132 |
| 4,720,667 | 1/1988 | Lee et al. | 323/271 |
| 4,720,668 | 1/1988 | Lee et al. | 323/271 |
| 4,791,542 | 12/1988 | Piaskowski | 363/75 |

OTHER PUBLICATIONS

Cuk et al., "Small Signal Analysis of Resonant Converters"; Jun. 1983, IEEE Power Specialists Conference.
Lee et al., "State Plane Analysis of Parallel Resonant Converters"; Jun. 1985, IEEE, pp. 56–73.
Davian; "Design Considerations of Very High Frequency Resonant Mode DC/DC Converters"; Mar. 1986, IEEE.
Lee et al., "Zero Voltage Switching Technique in DC/DC Converters"; Jun. 1986, IEEE, pp. 58–70.
Kang et al.; "Analysis and Design of a Half Bridge Parallel Resonant Converter"; Jun. 1987, IEEE, pp. 231–243.

Primary Examiner—Peter S. Wong
Assistant Examiner—Jeffrey Sterrett

[57] ABSTRACT

A parallel resonant converter as disclosed having in one embodiment a variable inductance and having a control circuit which operates the switches of the converter under zero voltage switching conditions and under continuous conduction mode by maintaining the quality factor of the resonant circuit generally equal to the DC conversion ratio.

16 Claims, 9 Drawing Sheets $$\left| \frac{I_L(t_o)}{I_g} \right| = |I_{nlow}|$$

PARALLEL RESONANT CONVERTER WITH ZERO VOLTAGE SWITCHING

TECHNICAL FIELD

This invention relates to the general subject matter of power supplies and, in particular, to the subject of parallel resonant converters.

BACKGROUND OF THE INVENTION

In power processing circuits, magnetic elements and capacitors invariably play the major roles of energy storage, energy transfer, and ripple filtering. Since they constitute a large portion of the overall equipment, weight, volume, and cost, it is desirable to design a converter capable of operating at high frequencies. However, switching an inductive load at high frequencies imposes high switching losses and switching stresses on semi-conductor devices.

Operation of converters at megahertz frequencies is also strongly influenced by the effects of such parasitic elements as interconnect and leakage inductance and parasitic and junction capacitances. Some parasitics, such as leakage inductance of a transformer, can be constructively used in the circuit. Other parasitics may have adverse effects on circuit performance and may be minimized by a compact circuit layout design.

Resonant converters have been found to be attractive for high-power applications because they allow high frequency operation and reduction in size and weight, without sacrificing circuited efficiency and without imposing excessive stress on switching devices.

In a parallel resonant converter (PRC), the output voltage is obtained after rectification and filtering of the resonant capacitor voltage, whereas in a series resonant converter (SRC) the output voltage is obtained after rectification and filtering of the resonant current. Generally, when operating at frequencies that are sufficiently less than the tank frequency, a SRC behaves as a current source, whereas a PRC acts as a voltage source. Thus, in voltage regulator applications, a PRC requires much less operating frequency range than an SRC to compensate for load variations. A PRC is preferable for voltage regulation applications having a wide load variation, such as switching power supplies, mainly because of its load independent feature. Besides being relatively load insensitive, a PRC has excellent control characteristics and provides a good cross regulation compared to a SRC. Other advantages of a PRC include: low losses during switching, low EMI, low switching component stresses, low frequency control range, high frequency operation, helpful parasitics, and simple control loop compensation. The disadvantages of a PRC are: high complexity (relative to a PWM type switchmode power supply), high circulating energies and secondary current limiting. On the whole, a PRC is often the preferred configuration. A detailed graphical analysis of a PRC is described in a 1985 paper, "State-Plane Analysis of a Parallel Resonant Converter", by Oruganti and Lee (IEEE Catalog No. 0275-9306/85/0000-0056).

Those skilled in the art know that a converter operating in the continuous conduction mode neither has the voltage across the capacitor or the current through the inductor staying zero for any time interval. A half-bridge PRC is analyzed in detail for both continuous conduction mode and discontinuous conduction mode operations in a 1987 paper, "Analysis and Design of a Half-Bridge Parallel Resonant Converter", by Kang and Upadhyay (IEEE Catalog No. 0275-9306/87/0000-0231).

The DC to DC conversion ratio "M" of resonant converters is often controlled by changing the ratio of switching frequency to resonant frequency "$f_s/f_0$". An analysis is provided in the paper, "Small Signal Analysis of Resonant Converters", by Cuk et al, IEEE Power Electronics Specialists Conference, June 6-9, 1983.

Pulse Width Modulation (PWM) is frequently employed in the control of switch mode power supplies. The PWM technique processes power by interrupting the power flow and controlling the duty cycle; thus, pulsating current and voltage waveforms result. By contrast, the resonant control technique processes power in a sinusoidal form.

For a given switching converter, the presence of leakage inductances in the transformer and junction capacitances in semi-conductor devices, causes the power devices to operate in inductive turn-off and capacitive turn-on. When a semi-conductor device switches off an inductive load, voltage spikes are induced by the sharp di/dt across the inductances. On the other hand, when the device turns on at a high voltage level, the energy stored in the output capacitance, $0.5 CV^2$, is trapped and dissipated inside the device. Furthermore, turn-on at high voltage levels induces a severe switching loss, known as the Miller Effect, which is coupled into the drive circuit, leading to significant noise and instability. The capacitive turn-on loss due to the discharging of the parasitic junction capacitances of power MOSFETs often becomes the dominating factor when the switching frequency is raised to the megahertz range.

The concept of zero-current switching is disclosed in U.S. Pat. No. 4,720,667 to Lee et al. However, the zero-current switching technique cannot solve the problem of high switching loss associated with the capacitive turn-on; therefore, its operation is somewhat limited to the lower megahertz range. U.S. Pat. No. 4,720,668 to Lee et al, discloses a zero-voltage switching technique. Specifically, a family "quasi-resonant converters" is derived from the principal of the zero-current switching converters by applying the duality principle. For the zero-current switching technique, the objective is to use auxiliary LC resonant elements to shape the switching device's current waveform at on-time in order to create a zero-current condition for the device to turn-off. The dual of this objection is: To use auxiliary LC resonant elements to shape the switching device's voltage waveform at off-time in order to create a zero-voltage condition for the device to turn-on. Further information is given in the 1986 paper, "Zero-Voltage Switching Technique in DC/DC Converters", by Liu and Lee, (IEEE Catalog No. 0275-9306/86/0000-0058). Thus, PRC's and methods to control them are still not fully developed and further work is needed.

OBJECTS OF THE INVENTION

One principal objective of the invention is to disclose a parallel resonant converter which operates in the continuous conduction mode and which operates under zero voltage switching conditions.

Another object of the invention is to disclose a unique parallel resonant converter which controls a variable inductor to regulate the voltage output.

Still another object of the invention is to disclose a parallel resonant converter that follows a control law wherein the conversion ratio is maintained generally equal to the quality factor of the resonant circuit.

Yet another object of the invention is to disclose a new control scheme for a high frequency parallel resonant converter.

A final object of the invention is to disclose one specific PRC which operates under zero voltage switching conditions in the continuous conduction mode.

Numerous other advantages and features of the present invention will become readily apparent from the following detailed description of the invention, the embodiments described therein, from the claims, and from the accompanying drawings.

DETAILED DESCRIPTION OF THE PREFERRED EMBODIMENT

Figure 1A:
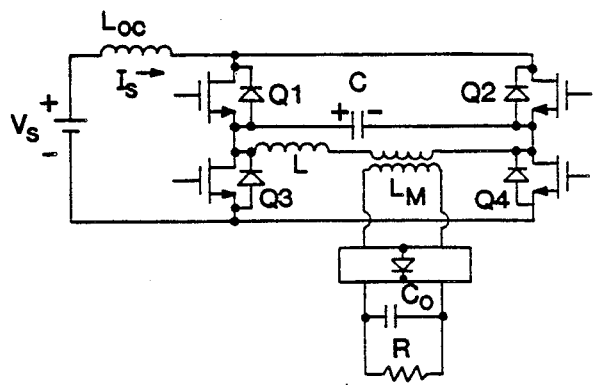
FIG. 1A is a schematic diagram of a prior art parallel resonant converter (PRC)

While this invention is susceptible of embodiment in many different forms, there is shown in the drawings and will herein be described in detail one specific embodiment of the invention. It should be understood, however, that the present disclosure is to be considered as an exemplification of the principles of the invention and is not intended to limit the invention to the specific embodiments illustrated. (See ref. 10)

Before describing a specific converter, the basic principles of the invention will be described.

Basic Principles

Figure 2C:
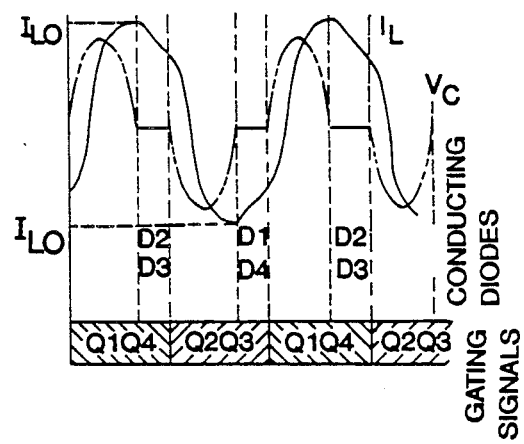
FIG. 2C is a representation of the waveform of the converter of FIG. 1A.

Turning to the drawings, FIG. 1A is a diagram of a prior art current fed PRC described in the paper "Design Considerations for Very High Frequency Resonant Mode DC/DC Converters", by D. M. Divan (IEEE Catalog No. CH22772-3/86/0000-0640. The transistor switches Q1 through Q4 of the H-bridge are gated alternately in pairs to provide a square wave current drive to the resonant circuit comprising a fixed capacitor C and fixed inductor L. The output of the PRC is depicted in FIG. 2C. The inductor current $I_L$ con-sinusoidally reverses from $I_{LO}$ to $-I_{LO}$. Subsequently, the inductor current free wheels through diodes (i.e., D2 and D3, when Q1 and Q4 are gated). During this period time, the capacitor voltage is clamped to zero until the next pair of switches (i.e., Q2 and Q3) are turned on. This circuit has the disadvantage of not operating in a continuous conduction mode. The time period when the diodes conduct (i.e., D2 and D3) and before the next set of switches are operated is "dead time" and the output of the converter is controlled by adjusting this dead time. Another disadvantage is that as the dead time increases, a larger output filter is needed.

Figure 1B:
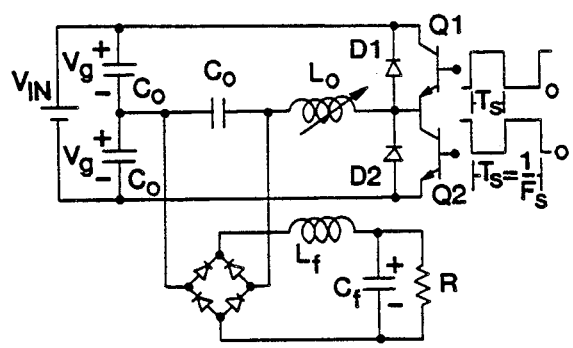
FIG. 1B is a schematic diagram of a practical PRC that is the subject of the present invention.
Figure 1C:
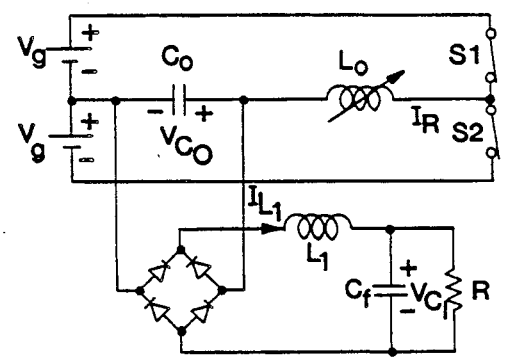
FIG. 1C is an ideal circuit diagram for the PRC of FIG. 1B.

An improved, voltage fed, half-bridge parallel resonant converter (PRC) and its ideal equivalent circuit are shown in FIGS. 1B and 1C. Input capacitors $C_{00}$ have values much greater than resonant capacitor $C_0$. The input capacitors $C_{00}$ function as voltage dividers. The resonant inductor $L_0$ is schematically represented to be a variable inductance, much unlike that of the prior art. As will be explained later, the resonant capacitor may be made variable and the inductor held fixed. Here bi-directional switches S1 and S2 are formed by the parallel combination of a transistor and a diode, so as to operate complementarily. The output DC voltage is obtained by rectifying the voltage across the resonant capacitor $C_0$. A low pass filter to smooth out the output voltage and current to the load R is obtained by capacitor Cf and inductor Lf.

Figure 1D:
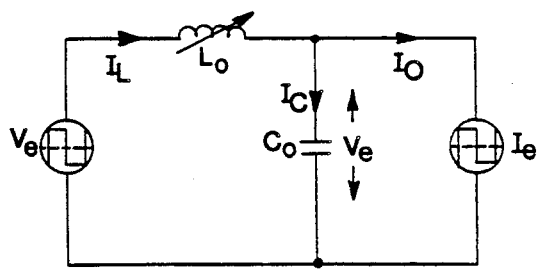
FIG. 1D is a diagram of the equivalent circuit of a PRC operating in a continuous conduction mode (CCM) of operation.

FIG. 1D is the equivalent circuit when the PRC is operated in the continuous conduction mode (CCM). The output current $I_0$ can be considered constant during the switching period, since the switching frequency is usually much higher than the corner frequency of the output filter.

Figure 2A:
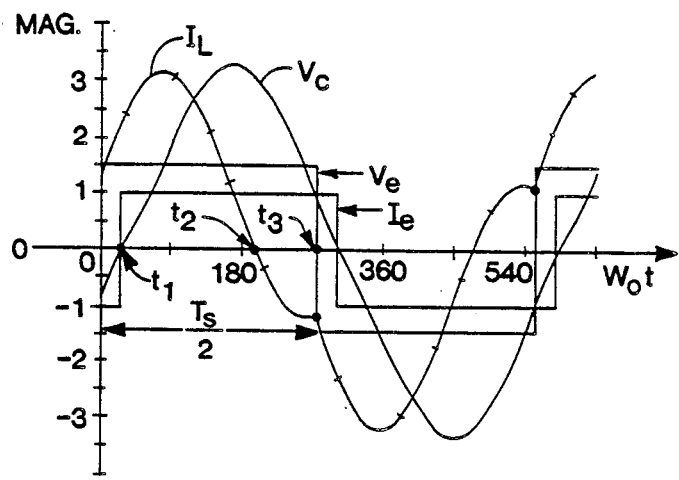
FIGS. 2A and 2B are representative of PRC waveforms when operated in the CCM over two frequency ranges.
Figure 2B:
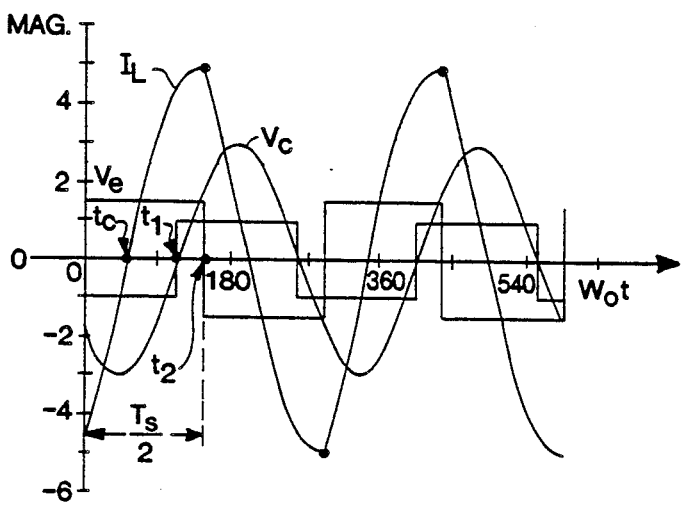

When a PRC is operated in the continuous conduction mode (CCM), the waveforms depend on the resonant frequency $W_f$. FIG. 2A shows the waveforms for a PRC operated in the CCM when operated at frequency less than the resonant frequency. When the PRC is operated in the CCM at frequency greater the resonant frequency, the output waveforms are much as that shown in FIG. 2B. In each of these figures, the voltage across the capacitor and the current through the inductor are sinusoidal. This is in contrast to the discontinuous conduction mode where there are discontinuities (see FIG. 2C)

The problem of turn-off switching loss can be over come by switching at a zero voltage across the resonant capacitor. It can be shown that this condition can be obtained by maintaining the ratio $M_b/Q_b = 1$, where $M_b$ is DC Conversion Ratio and $Q_b$ is the Quality Factor of the circuit. Specifically, $$I_0/I_g = V_g/V_0 = M_b$$

This follows from:

$$V_0 I_0 = V_g I_g$$

The quality factor is expressed by the ratio $R_0/Z_0$ where $R_0$ is load resistance, and $Z_0$, the characteristic impedance, is square root of $L_0/C_0$. The resonant frequency $W_r$ is $C/(\text{square root of } L_0C_0)$.

When load current is varied, the output voltage cannot remain at the rated value under the zero voltage switching condition. However, if the characteristic impedance $Z_0$ is changed so that the quality factor $Q_b$ is maintained constant, the zero voltage switching condition can be maintained. In other words, the output voltage can be maintained at the rated value under the zero voltage switching constraint by changing the characteristic impedance $Z_0$ so that the quality factor becomes constant. As a consequence, $M_b = Q_b$ will be constant or regulated.

Figure 3A:
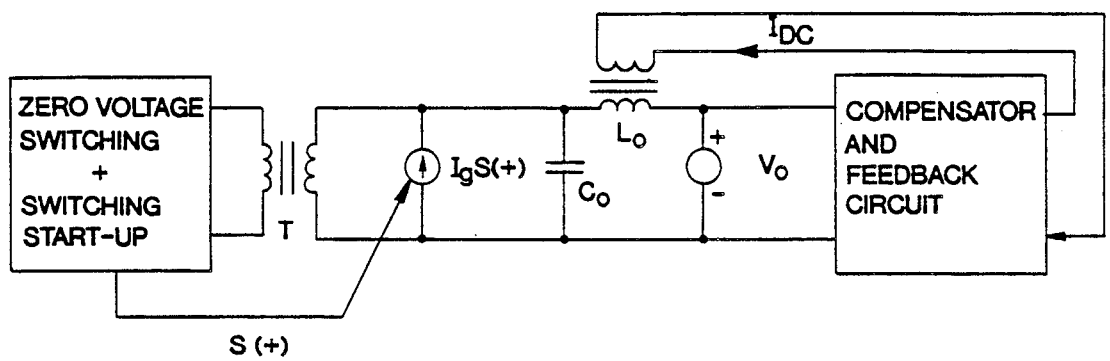
FIG. 3A is a block diagram of one PRC that is the subject of the present invention.

There are two ways adjust the characteristic impedance $Z_0$:

(a) adjust the resonant inductance $L_0$; and (b) adjust the resonant capacitance $C_0$. To control by adjustable inductance, an extra winding $N_c$ around the inductor core 10 may be used to provide a DC bias current so that the dynamic permeability can be varied. This concept is illustrated in FIG. 3D. To control by adjustable or variable capacitance $C_0$, a varactor diode VAR may be used with a proper adjustable bias, much as that shown in FIG. 3E.

In either of these two ways, the gain or DC conversion ratio $M_b$ can be adjusted by varying or adjusting the quality factor $Q_b$. A block diagram of this concept is illustrated in FIG. 3A. This method of control may be termed "quality factor control" or "Q-control". In high frequency operation, Q-control can be well applied due to the ease in the regulation of quality factor to cover a wide load range. Note however, a practical converter would need a Switching Start-up Circuit from the initial or at rest condition so that the zero voltage switching circuit can function.

Figure 3B:
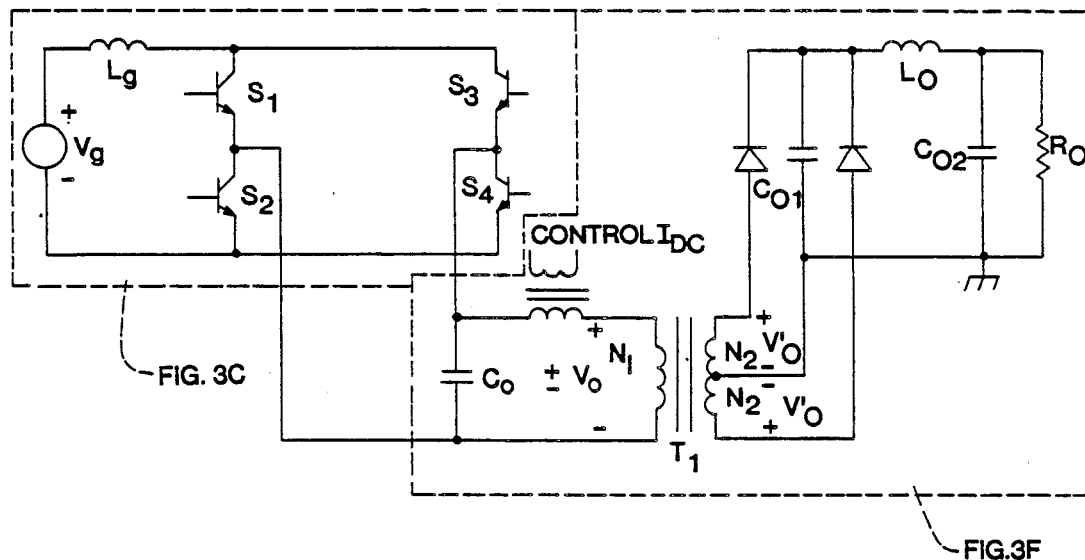
FIG. 3B is a schematic diagram of the PRC of FIG. 3A.
Figure 3C:
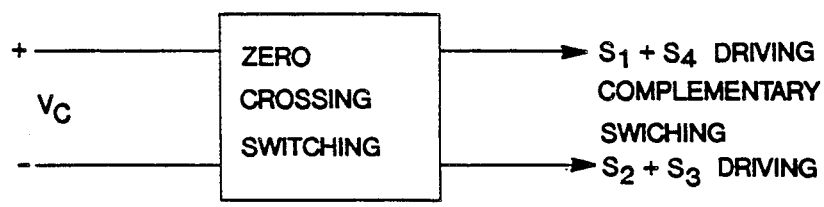
FIG. 3C is a simplified block diagram of the PRC of FIG. 3B.
Figure 3D:
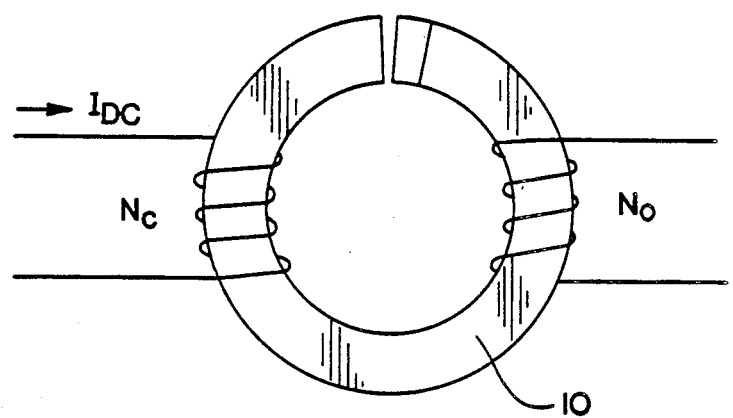
FIGS. 3D and 3E are schematic diagrams of means by which tank impedance may be varied.
Figure 3E:
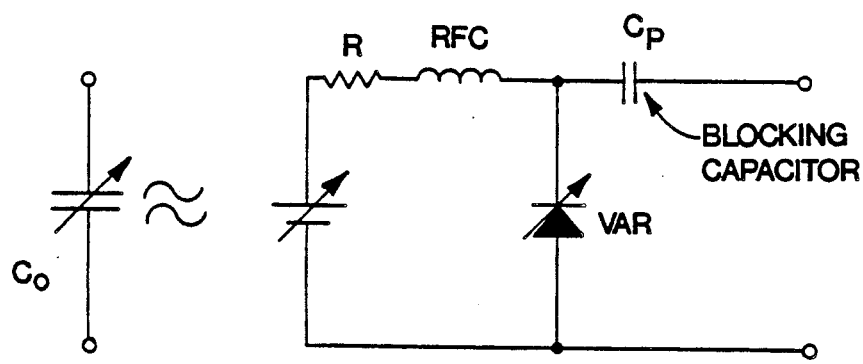

Referring now to FIG. 3B, the Q-control concept will be outlined. A simplified block diagram of the circuit in FIG. 3B is illustrated in FIG. 3C. The following parameters are assumed to be given or specified:

$F_s$ = full load switching frequency;
$V_g$ = source voltage;
$V_0'$ = output voltage plus voltage drop in rectifiers;
$I_0$ = output full load current; and either
$Q_b$ = the quality factor or
$N_1:N_2$ = the transformer turn ratio.

The main objective is to find the resonant capacitance, the range of the resonant inductance from light load to full load (typically 20% to 100%) and the transformer turn ratio (if not already specified).

If the quality factor $Q_b$ is given, then the voltage gain $M_b$, by definition of Q-control, is equal to $Q_b$. As a result, $V_0$ at the primary side of the transformer becomes:

$$V_0 = V_g/Q_b$$

The transformer turn ratio is then:

$$N_1/N_2 = V_0/V_0' = V_g/(Q_b V_0')$$

If the transformer turn ratio is given, then $Q_b$ can be calculated as:

$$Q_b = V_0/V_g = (N_1/N_2)*(V_0'/V_g)$$

Now, the parameter "gamma" $g_a$ is the product of pi (i.e., 3.1416 ...) and the quantity $F_0/F_s$, where $F_0$ is the resonant frequency and $F_s$ is the switching frequency:

$$g_a = \text{pi } F_0/F_s$$

and $$W_0 = 2 g_a F_s$$

For a known or given value of $Q_b$, the value of gamma $g_a$ can be obtained from a plot of gamma versus $Q_b$. Therefore, the full load resonant angular frequency can be determined from the full load switching frequency $F_s$ by the formula:

$$W_0 = 2 g_a F_s \tag{1}$$

The characteristic impedance $Z_0$ at full load and light load can be determined from:

$$Z_{0full} = Q_b V_0'* (N_1/N_2)^2/I_{0full} \tag{2}$$

$$Z_{0light} = Q_b V_0'* (N_1/N_2)^2/I_{0light} \tag{3}$$

From equations (1) and (2), the resonant capacitance $C_0$ and the resonant inductance $L_0$ can be found by:

$$C_0 = 1/(Z_0 W_0) \tag{4}$$

$$L_{full} = Z_{0full}/W_0 \tag{5}$$

$$L_{light} = C_0 (Z_{0light})^2 \tag{6}$$

The on-current through each switching transistor is:

$$I_g = I_{ON} = Q_b I_0 (N_2/N_1) \tag{7}$$

The average current through each transistor is:

$$I_{avON} = I_{ON}/2 \tag{8}$$

The source inductance $L_g$ can be much bigger than the resonant inductance at light load. It can assumed that $$L_g > 10 L_{light} \tag{9}$$

The peak voltage across the resonant capacitor can be determined by first using the table or the curve of $I_{nLOW}$ versus $Q_b$ (See FIG. 3G) to obtain $I_{nLOW}$ for a given $Q_b$.

$$I_0' = N_2 I_0/N_1 \tag{10}$$

Since gamma, $Q_b$ and $I_{nLOW}$ are known, and $$V_{CPeak} = (1 + [(I_{nLO} - 1)^2 + 1]^{\frac{1}{2}}) I_0' Z_{0full}/Q_b \tag{11}$$

The peak current through the resonant inductor can be determined from:

$$I_{LPeak} = V_{CPeak}/Z_{0full} \tag{12}$$

The outline of the design just presented provides the necessary information to proceed. Specifically, the following example was studied:

$F_s$ = 200 KHZ
$V_g$ = 300 volts
$V_0'$ = 6 volts
$I_0$ = 20 amperes
$Q_b$ = 2
Load range: 2.5 amps to 20 amps
The transformer turn ratio is:

$$N_1/N_2 = V_g/(Q_b V_0') = 300/(2*6) = 25:1$$

From a curve of gamma versus $Q_b$, $$g_a = 3.623 \text{ radians at } Q_b = 2$$

From equation (1), the resonant frequency is:

$$W_0 = 2g_a F_s = 1.4492*10^6 \text{ rad/sec.}$$

From equation (2), the characteristic impedance $Z_0$ can be calculated from $$Z_{0full} = Q_b V_0'*(N_1/N_2)^2/I_{0full} = 2*(25)^2*6/20 = 375 \text{ ohms}$$

From equations (2) and (3):

$$Z_{0light} = Z_{0full}*20/2.5 = 3000 \text{ ohms}$$

The resonant capacitance $C_0$ and resonant inductance $L_0$ can be found using equation (4):

$$C_0 = 1/(Z_{0full} W_0) = 1.84 \text{ nF}$$

and from equations (5) and (6)

$$L_{full} = Z_{0full}/W_0 = 375/(1.4492*10^6) = 0.2587 \text{ mH}$$

$$L_{light} = (Z_{0light})^2 C_0 = 16.56 \text{ mH}$$

The full load switching frequency $F_s$ is 200 KHz. The light load switching frequency is $$F_{sLight} = 1/[2 \ g_a \ (16.56*1.84)^{\frac{1}{2}}] = 25 \text{ KHz}$$

The switching frequency will be automatically self-adjusting from the zero voltage switching concept. Simulation analysis has confirmed these results and the Q-factor method of control.

Basic Embodiment

Figure 4:
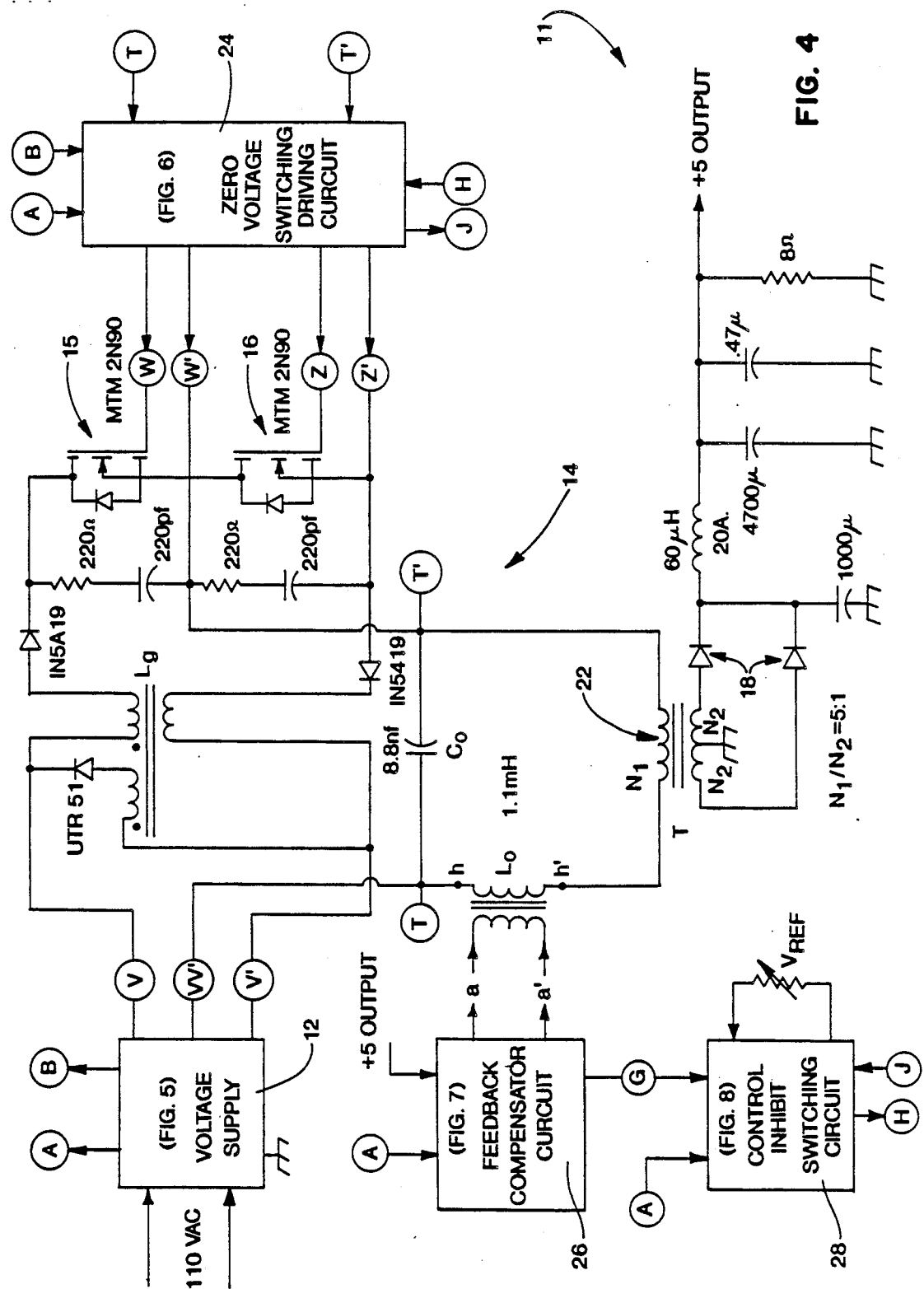
FIG. 4 is a block diagram of a prototype PRC which incorporate the principles of the subject invention.

FIG. 4 is a block diagram of a prototype parallel resonant converter which incorporates the principles of the subject invention. Specifically, the converter 11 comprises a Voltage Supply 12, a Power Stage Circuit 14 having two complimentary operated power switches 15 and 16, a resonant capacitor $C_0$, a variable inductor $L_0$, a step-down power transformer 22 having a center tap secondary, a Zero Voltage Switching Driving Circuit 24, a Feedback Compensator Circuit 26, and a Control Inhibit-Switching Circuit 28.

Figure 5:
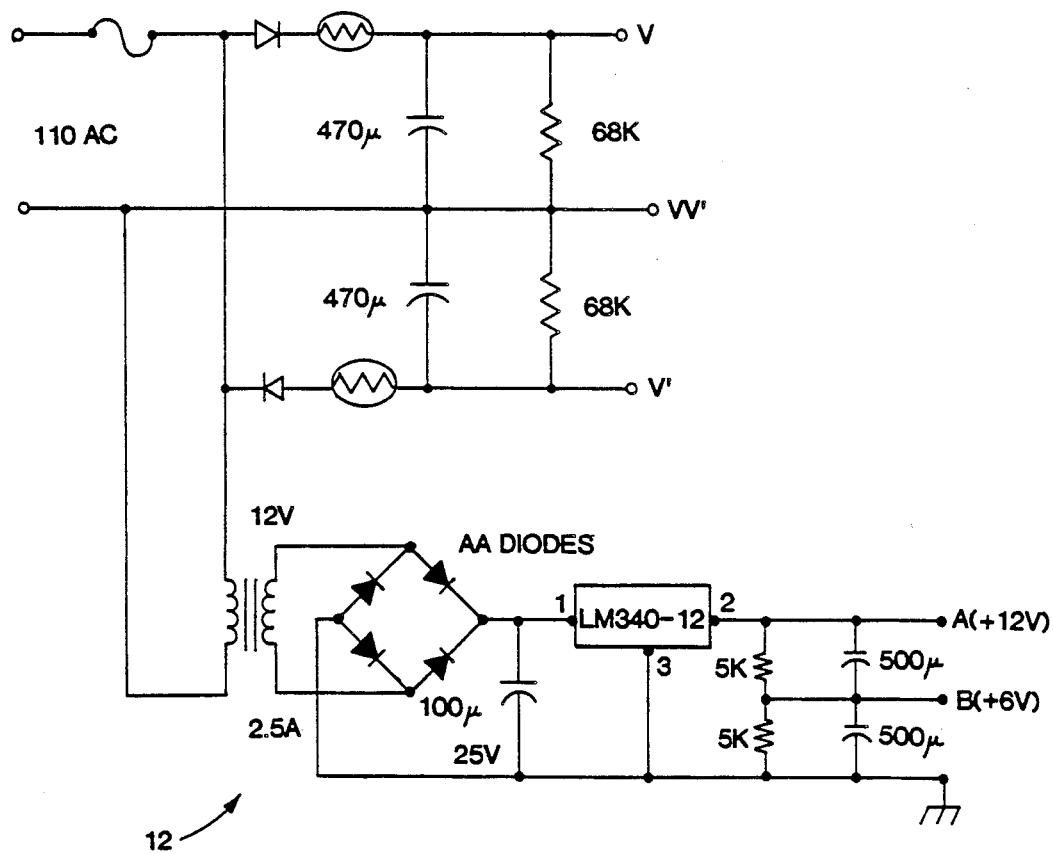
FIGS. 5 through 8 are schematic diagrams of the circuit blocks of FIG. 4.

Turning first to FIG. 5, 110 volt AC line voltage is supplied through a diode network to three voltage supply rails V, V', and VV'. Line voltage is also supplied through a 12 volt transformer to a full-wave rectifier bridge and an IC voltage regulator LM340-12 to provide a source of 12 volt and 6 volt regulated voltage "A" and "B".

Returning to FIG. 4, the Power Stage Circuit 14 includes a filtering inductor $L_g$, here having a value at least greater than 10.7 mH. The resonant tank circuit comprises a capacitor $C_0$ which joins the node W' between the two switches 15 and 16 and the common power supply rail VV'. A variable inductor $L_0$ is connected in series with the output power transformer 22. The series circuit of the variable inductor $L_0$ and the transformer 22 is in parallel with the resonant capacitor $C_0$. The output of the transformer 22 is full-wave rectified (using two 15 amp, 60 Volt Shottky diodes 18) and filtered to produce a 5 volt DC output.

Figure 6:
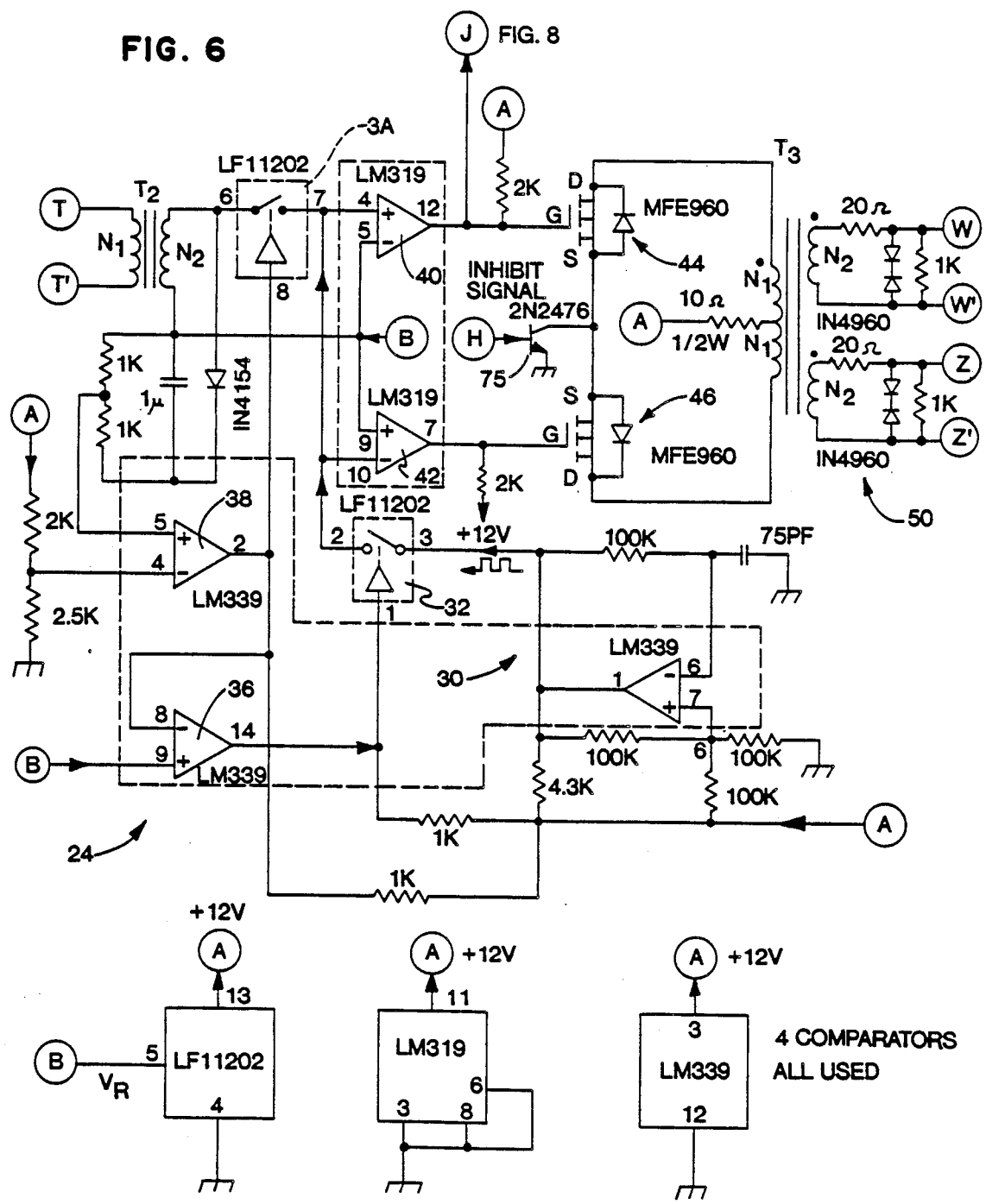

Turning now to FIG. 6, the Zero Voltage Switching Driving Circuit 24 is illustrated. The purpose of the circuit is to switch or operate the two switches 15 and 16 under zero voltage conditions across the resonant capacitor $C_0$. A 100 KHz square wave generator 30 is used to supply or to provide a square wave voltage train to an analog switch 32. The voltage TT' across the resonant capacitor $C_0$ is sensed by means of a control transformer T2. This voltage is supplied to another analog switch 34. Only one of the two analog switches 32 and 34 is closed. The analog switches are operated by two comparators 36 and 38. When the Voltage Supply 12 is first turned on (i.e., during start-up), the first analog switch 32 (i.e., the one that is connected to the 100 KHz square wave generator 30) closes. After the PRC is running, there is sufficient voltage across T2 to switch the comparators 36 and 38; thereafter, the first analog switch 32 opens and the other analog switch 34 closes. The output from the two analog switches 32 and 34 is sent to two high speed control comparators 40 and 42 to drive two transistor switches 44 and 46 which complementarily operate the two power switches 15 and 16, through a transformer T3 and a driver circuit 50. The two transistor switches 44 and 46 are joined to ground using a normally conducting NPN transistor 75. The circuit at the secondary of the control transformer T2 insures that it is only when there is zero voltage, that the two transistor switches 44 and 46 operate.

Figure 7:
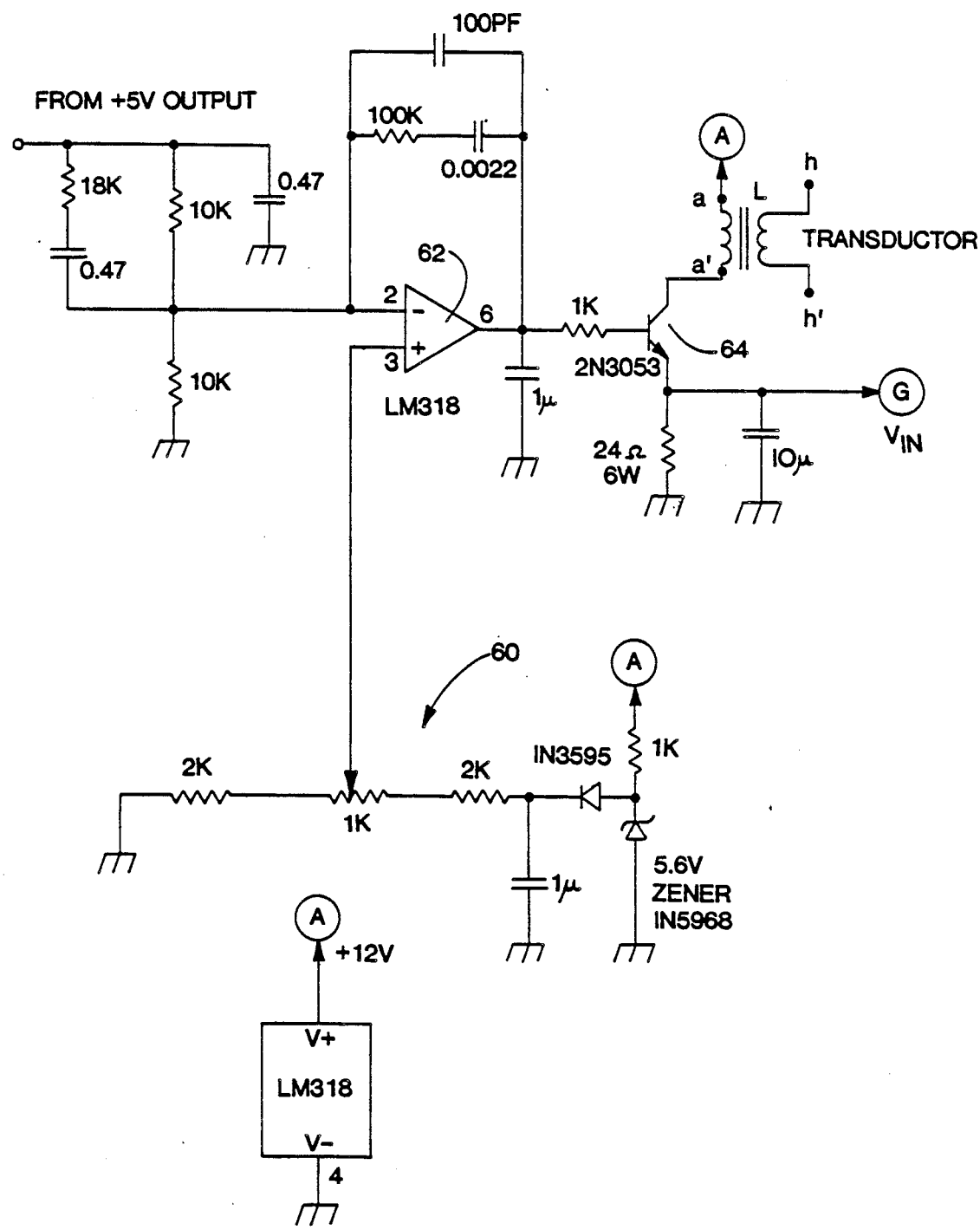

Referring to FIG. 7, the Feedback Compensator Circuit 26 is illustrated. There, the five volt output +5 V is compared to a voltage obtained from a reference network 60 using an operational amplifier 62 configured as a error amplifiers and stabilized against an inductive load. The output of the amplifier 62 is used to control a transistor configured as an emitter follower 64. When the follower 64 is turned "on" by the amplifier 62, current flows through the bias windings a-a' of inductor $L_o$, thereby changing its effective inductance or inductive impedance and the quality factor $Q_b$ of the PRC. When the reference voltage supplied to the inverting input of the amplifier 62 exceeds the reference voltage, the amplifier turns "off" and the current through the bias windings goes "off". This allows the output voltage to increase again. Thus, the DC conversion ratio is controlled by the Quality Factor of the PRC.

Figure 8:
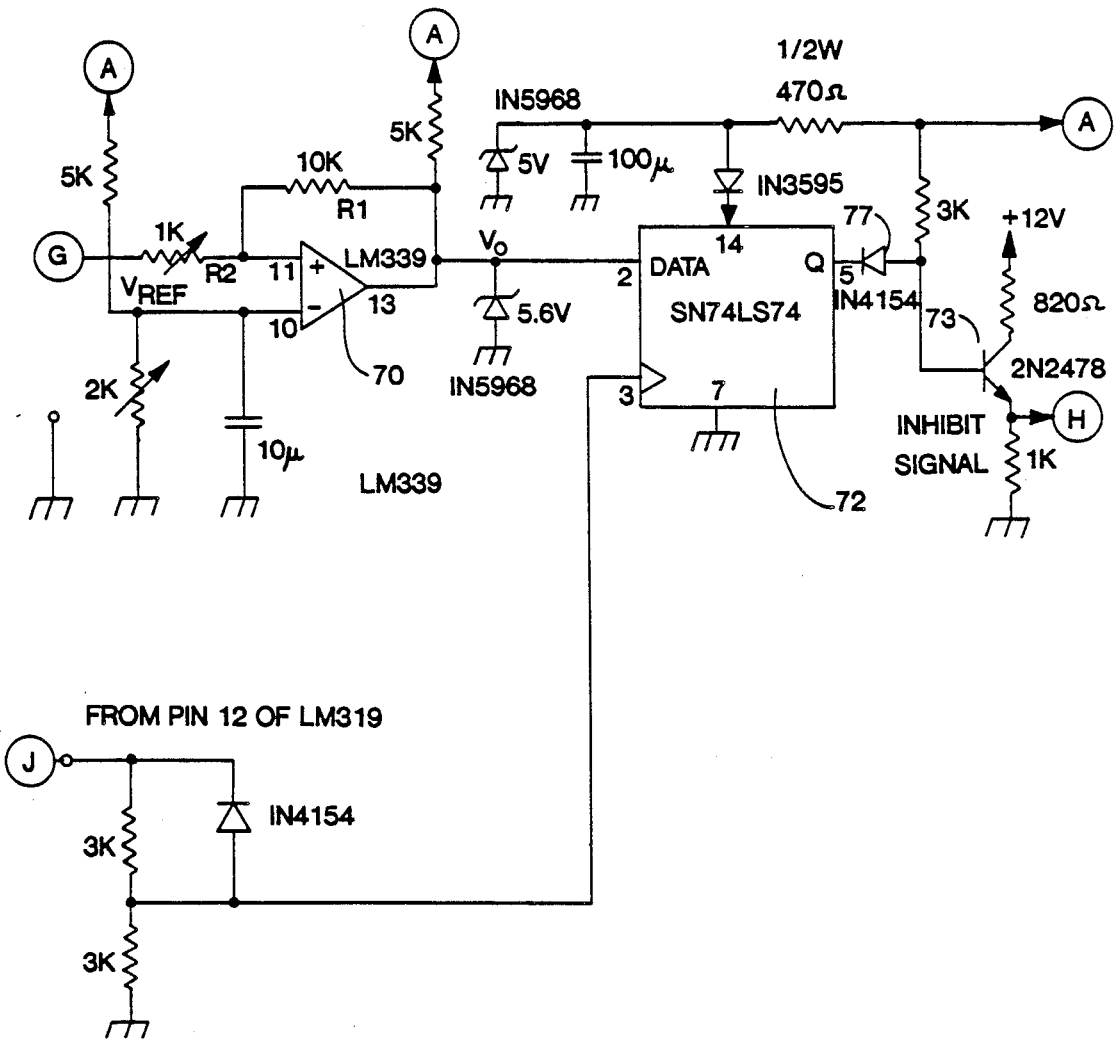
Figure 9:
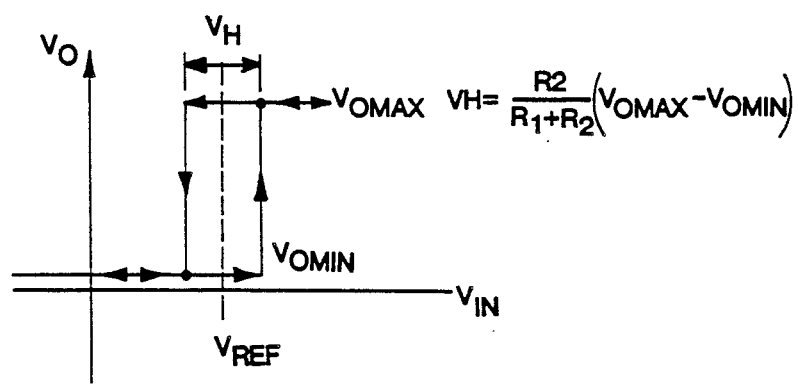
FIG. 9 is a representation of the output characteristic of comparator 70 included in the schematic diagram of FIG. 8.

Turning now to FIG. 8, the output "G" of the amplifier 62 and emitter follower 64 of the Feedback Compensator Circuit 26 is fed to the non-inverting input of a control-inhibit comparator 70. This comparator 70 has at its inverting input a reference voltage Vref. The voltage or output characteristic of the comparator 70 is shown in FIG. 9. The output $V_0$ of the comparator 70 feeds a flip-flop or data latch 72. The data latch 72 is clocked (at pin 3) by a pulse obtained from the output of one of the two comparators (i.e., 40) in the Zero Voltage-Switching Driving Circuit (FIG. 6). The latch 72 output "Q" is used to control an emitter follower 73 which controls a transistor switch 75 located at the common node between the two driver control switches 44 and 46.

When the control-inhibit comparator 70 is producing a "high" output and a zero switching pulse is produced "J", the flip-flop 72 output "Q", through a diode 77, allows the follower 73 to conduct and the node switch 75 to conduct. This allows the current to flow from the center tap of the driver transformer T3 through which of the two central switches 44 and 46 is gated by the control comparators 40 and 42. However, if the voltage comparator 70 does not produce a high output when the clock pulse is applied to the flip-flop 72, then the node switch 75 is "open", which inhibits the driver circuit 50.

In summary, the PRC, diagrammed in FIG. 4, controls the output voltage by controlling the variable inductance and switching the power switches when zero voltage switching conditions are achieved across the resonant capacitor. Moreover, the current flow is continuous.

From the foregoing description, it will be observed that numerous variations, alternatives and modifications will be apparent to those skilled in the art. Accordingly, this description is to be construed as illustrative only and is for the purpose of teaching those skilled in the art the manner of carrying out the invention. Equivalent elements may be substituted for those illustrated and described herein, and other control circuits may be employed to control the variable inductance.

Figure 1E:
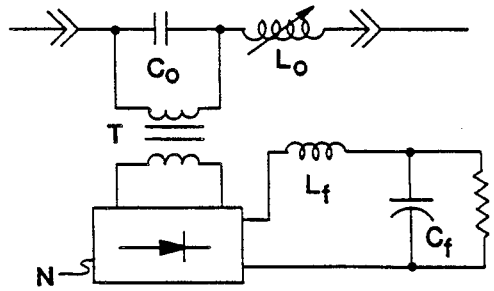
FIGS. 1E through 1G and 3F are partial schematic diagrams of variations of the PRC of FIGS. 1B and 3B, respectively.
Figure 1F:
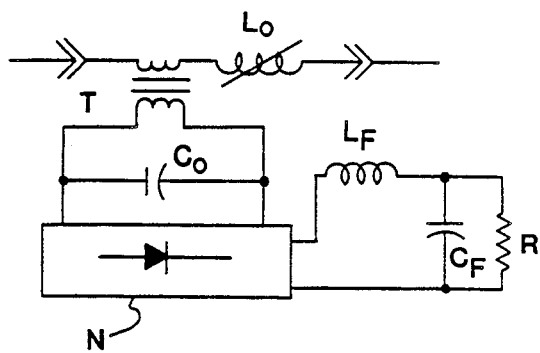
Figure 1G:
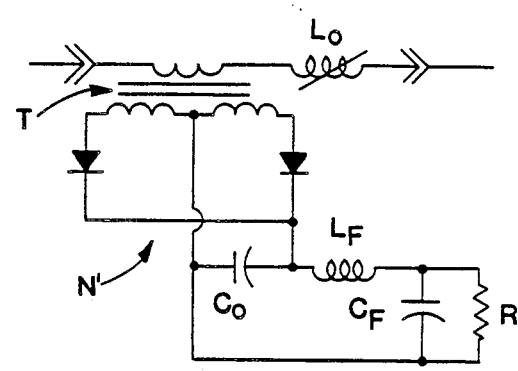
Figure 3F:
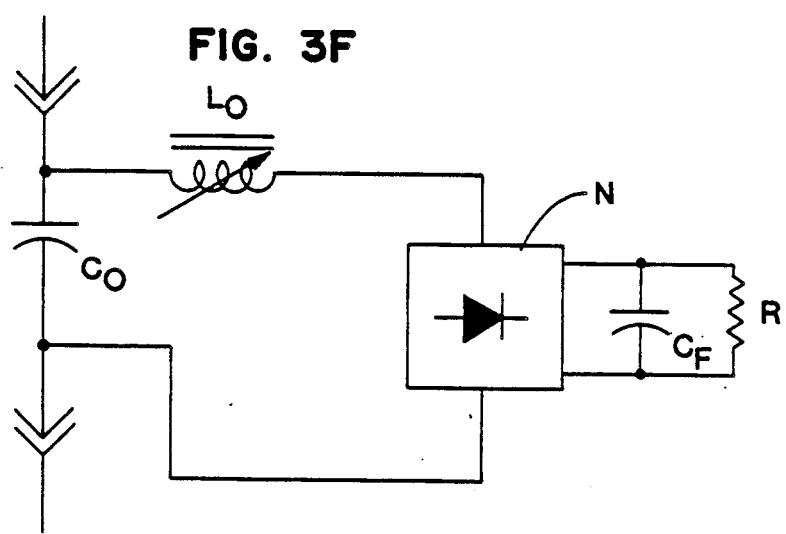
Figure 3G:
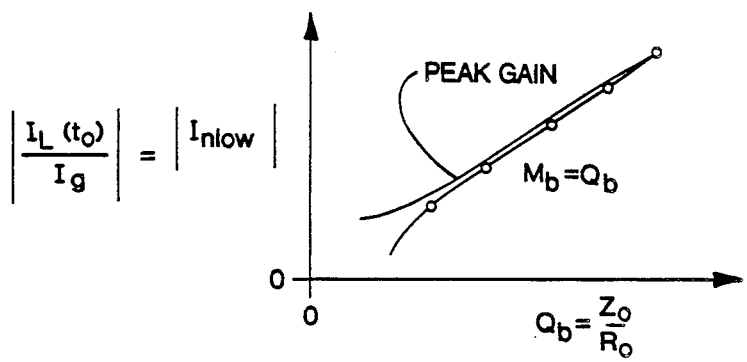
FIG. 3G is a representative plot of $Q_b$ vs. $I_{nLOW}$.

For example, FIGS. 1E, 1F and 1G are variations of the PRC illustrated in FIG. 1B. Specifically, in FIG. 1E, a transformer T has its primary windings connected across the capacitor $C_0$. The high frequency transformer T provides isolation and a voltage step-up or step-down. The secondary of transformer T is connect to a rectifying network N and then to the filter formed by Lf and Cf. The rectifying network N may be a full-wave rectifying network using four diodes arranged in a bridge (See FIG. 1B) or using two diodes and a split secondary transformer T', much as that shown in FIG. 1G. In FIG. 1F, the transformer T is connected in series with the inductor $L_0$. The secondary of the transformer T contains the resonant capacitor $C_0$. The secondary of the transformer T also supplies the rectifying network N, and the filter network Lf and Cf for the load R. In FIG. 1G, the transformer T' is in series with the resonant inductor $L_0$. The secondary of the transformer T' supplies a full-wave rectifier network N', the resonant capacitor $C_0$, the filter network Lf and Cf, and the load R. Finally, FIG. 3F is a variation of the PRC of FIG. 3B; there, the inductor $L_0$ is in series with the rectifying network N, and the series circuit is in parallel with resonant capacitor $C_0$.

Thus, it will be appreciated that numerous various modifications, alternatives, variations, etc., may be made without departing from the spirit and scope of the invention as defined in the appended claims. It is, of course, intended to cover by the appended claims all such modifications as fall within the scope of the claims.

We claim:
1. A parallel resonant converter, comprising:
   (a) inductor impedance means and capacitor impedance means, one of said impedance means being variable over a pre-determined impedance;
   (b) a load electrically connected in series with said one impedance means to form a series circuit, said series circuit being connected electrically in parallel with the other impedance means, said load being characterized by an output voltage;
   (c) switched source of power means, comprising at least one switch operated by a driving circuit, for switching voltage through said series circuit and said other impedance means;
   (d) control circuit means, operating in response to said output voltage, for varying said one impedance means to maintain said output voltage within a pre-determined voltage range; and
   (e) feedback means, using a feedback voltage derived across said other impedance means, for supplying a control signal to said driving circuit to operate said switch under zero voltage switching conditions and continuous current flow through said load.

2. The converter of claim 1, wherein said switched source of power means comprises two switches, and wherein said driving circuit complementarily operates said two switches.

3. The converter of claim 2, wherein said load comprises a transformer having a primary winding and a secondary winding, and wherein said output voltage is produced from said secondary winding using at least one diode.

4. The converter of claim 3, further including:
   (f) means for inhibiting said driver circuit when the output voltage exceeds a predetermined amount.

5. The converter of claim 4, further including:
   (g) start-up means for operating said driver circuit before said output voltage is in said pre-determined range.

6. The converter of claim 1, wherein said one impedance means comprises an inductor core and a DC bias winding around said inductor core, said DC bias winding having current induced to flow therethrough in response to said control circuit means.

7. The converter of claim 1, wherein said one impedance means comprises a varactor diode which is in parallel with a biasing circuit comprising a variable DC power source electrically connected in series with fixed resistor means and a fixed inductor means, said DC power source being operated in response to said control circuit means.

8. A resonant converter, comprising:
   (a) variable inductor means characterized by an impedance of L;
   (b) fixed capacitor means characterized by an impedance of C;
   (c) a load electrically connected in series with said variable inductor means to form a series circuit, said series circuit being connected electrically in parallel across said fixed capacitor means, said load being characterized by an output voltage of Vo, a full load current of Io, a resistance of R, and a quality factor of Qb where Qb is the ratio of the square root of L/C to R;
   (d) the equivalent of two DC sources of power connected together in series and to one end of said fixed capacitor means at a common supply node, each of said sources being characterized by a voltage Vg;
   (e) the equivalent of two switches connected in series with each other and to the other end of said fixed capacitor means at a common switch node, the other ends of said switches being joined to the other ends of said two DC sources of power;
   (f) feedback means, using a feedback voltage derived from said output voltage, for adjusting said variable inductance means to maintain Qb essentially equal to the DC conversion ratio Mb, where Mb is the ratio of Vg to Vo; and
   (g) driver circuit means, operating in response to said feedback control means, for complementarily operating said two switches in a continuous conduction mode under zero voltage switching conditions.

9. The converter of claim 8, further including:
   (h) start up means for complementarily operating said two switches before said output voltage is above a predetermined value.

10. The converter of claim 9, wherein said driver circuit means operates said switches at a frequency range between fo/2 and fo, where fo is the resonant frequency.

11. A converter, comprising:
(a) means for providing a parallel resonant converter having an output voltage Vo using at least two switches which are connected in series with each other, capacitor means characterized by a capacitance of Co, inductor means characterized by an impedance of L, a load electrically connected in series with said inductance means to form a series circuit and power supply means for providing a switched supply of current to said at least two switches,
said load being characterized by a resistance of Ro, and a quality factor of Qb where Qb is the ratio of the square root of L/Co to Ro;
said power supply means comprising two DC sources of power connected together in series to each other at a common supply node, each of said sources being characterized by a voltage Vg;
said two switches being connected in series with each other at a common switch node, the ends of said switches being joined to the ends of said two DC sources of power, said series circuit being connected between said supply node and said switch node;
(b) means, using a feedback voltage which is a function of the voltage across said capacitor means, for changing the impedance of said inductance means by maintaining Mb essentially equal to Qb, where Mb is the ratio of Vg and Vo; and
(c) driver circuit means, operating at least in response to said voltage across said capacitor means, for operating said two switches under zero voltage switching conditions.

12. A resonant converter, comprising:
(a) inductor impedance means and capacitor impedance means with one of said impedance means being variable over a pre-determined impedance range;
(b) a load electrically connected in series with said one impedance means and in parallel with the other impedance means;
(c) switch means, comprising at least two switches which are operated at essentially zero voltage, for applying a predetermined source voltage across said other impedance means; and
(d) feedback means, using a voltage that is representative of the voltage across said other impedance means, for varying the impedance of said one impedance means to maintain the quality factor of the circuit essentially equal to the DC conversion ratio.

13. A resonant converter, comprising:
(a) variable reactive impedance;
(b) fixed reactive impedance;
(c) means, including a load electrically connected with said variable reactive impedance means and said fixed reactive impedance means, for forming a parallel resonant circuit;
(d) switched source of power means, comprising at least two switches which are operated with complementary duty cycle, for switching a predetermined source voltage across said fixed reactive impedance means under continuous conduction conditions; and
(e) feedback means, using a voltage that is a function of the voltage across said fixed reactive impedance means, for varying the impedance of said variable reactive impedance means to maintain the ratio of the source voltage to the load voltage generally proportional to the quality factor defined by said load and said reactive impedance means.

14. In a parallel resonant converter having a switched source of power, having inductor impedance means and capacitor impedance means, having a load electrically connected in parallel with one of the impedance means to form a parallel circuit and having the parallel circuit connected electrically in series with the other impedance means and across a switched source of power, a control circuit comprising:
(a) control means for varying the electrical impedance of the other impedance means;
(b) a compensation and feedback circuit for operating said control means to maintain the output voltage within a predetermined range in accordance with the control law M=Q, where "M" is the DC Conversion Ratio and "Q" is the Quality Factor of the parallel resonant converter and for operating said switched source of power to maintain continuous current flow through the load.

15. A parallel resonant converter, comprising:
(a) inductor means and capacitor means, said inductor means comprising an inductor core and DC bias winding means around said inductor core to vary the impedance of said inductor means over a pre-determined control range;
(b) a load electrically connected in series with said inductor means to form a series circuit, said series circuit being connected electrically in parallel with said capacitor means, said load comprising a transformer having a primary winding and a secondary winding from which an output voltage is produced;
(c) a switched source of power comprising at least two switches which are complementarily operated by a driver circuit in response to zero voltage switching conditions across said capacitor means and at a frequency generally between the resonant frequency and one-half the resonant frequency; and
(d) circuit means, operating in response to a voltage derived from said output voltage and a reference voltage, for supplying current through said bias winding to maintain said output voltage within a pre-determined voltage range.

16. The converter of claim 15, further including means, operating in response to said current to said bias winding, for inhibiting the operation of said two switches in the event that said output voltage exceeds said predetermined voltage range.

* * * * *